(12) United States Patent
Burkhardt et al.

(10) Patent No.: US 6,354,332 B1
(45) Date of Patent: Mar. 12, 2002

(54) COOLANT LINE FOR AIR CONDITIONING SYSTEMS

(75) Inventors: Carlo Burkhardt, Grunbach; Richard Bantscheff, Tiefenbronn; Bernhard Heil, Malsch; Kai Kowalewsky, Friolsheim; Frank Picard, Rodgau; Klaus Rettkowski, Maulbronn, all of (DE)

(73) Assignee: Witzenmann GmbH, Metallschlauch-Fabrik Pforzheim, Pforzheim (DE)

( * ) Notice: Subject to any disclaimer, the term of this patent is extended or adjusted under 35 U.S.C. 154(b) by 0 days.

(21) Appl. No.: 09/559,824

(22) Filed: Apr. 28, 2000

(30) Foreign Application Priority Data

Apr. 30, 1999 (DE) ............................ 199 19 715
Mar. 23, 2000 (DE) ............................ 100 14 560

(51) Int. Cl.⁷ ................................ F16L 11/16
(52) U.S. Cl. ............... 138/109; 138/112; 138/121; 138/131; 138/135; 138/142; 138/149
(58) Field of Search ............... 138/112, 109, 138/121, 131, 135, 149, 139, 142

(56) References Cited

U.S. PATENT DOCUMENTS 2,722,437 A * 11/1955 Phillips
2,836,200 A * 5/1958 Webbe ................ 138/121
3,240,234 A * 3/1966 Bond, Jr. et al. ........... 138/121
3,420,553 A * 1/1969 Poxon et al.
3,580,289 A * 5/1971 James, Jr. et al. .......... 138/121
3,773,087 A * 11/1973 Kafayama .................... 138/121
4,089,351 A * 5/1978 Ward et al. .................. 138/109
5,069,253 A * 12/1991 Hadley ........................ 138/109
5,297,586 A * 3/1994 McIntosh .................... 138/109
5,638,869 A * 6/1997 Zaborszki et al. .......... 138/109
5,803,128 A * 9/1998 Reed ........................... 138/109
6,016,842 A * 1/2000 Rooke ......................... 138/121

FOREIGN PATENT DOCUMENTS

DE          44 17 407        11/1995
DE          297 07908        10/1998
EP          0 657 683        6/1995

* cited by examiner

Primary Examiner—James Hook
(74) Attorney, Agent, or Firm—Venable; Gabor J. Kelemen

(57) ABSTRACT

A coolant line for air-conditioning systems that are operated with carbon dioxide as a coolant, particularly air-conditioning systems of motor vehicles, can be tightly connected at both ends to connecting parts. The line has an inside, metallic, corrugated hose that is coolant-tight, a radially pressure-resistant, flexible, metallic jacket that surrounds the hose with radial spacing and provides axial support, and a compression-proof, temperature-resistant intermediate plastic layer that fills the space between at least the radially-outside corrugation crests of the metal hose and the jacket so as to prevent play.

23 Claims, 2 Drawing Sheets

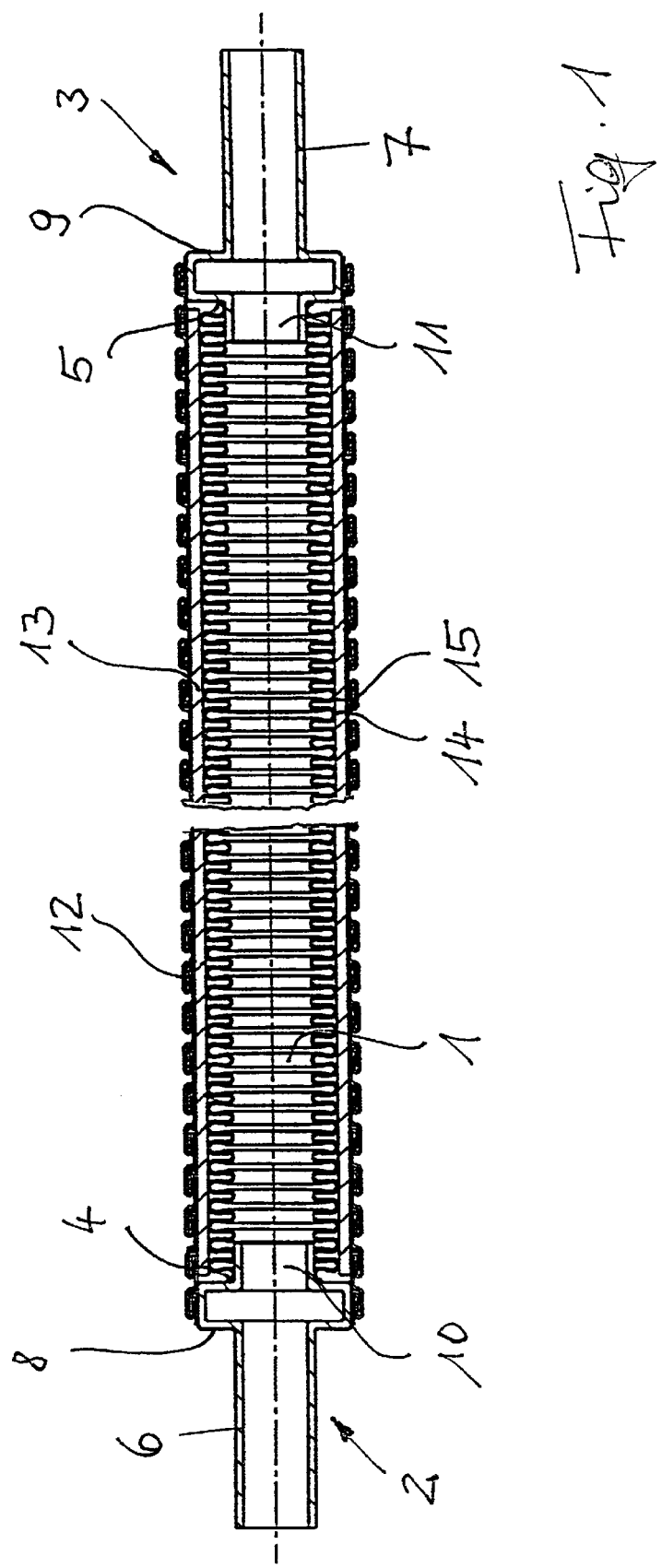

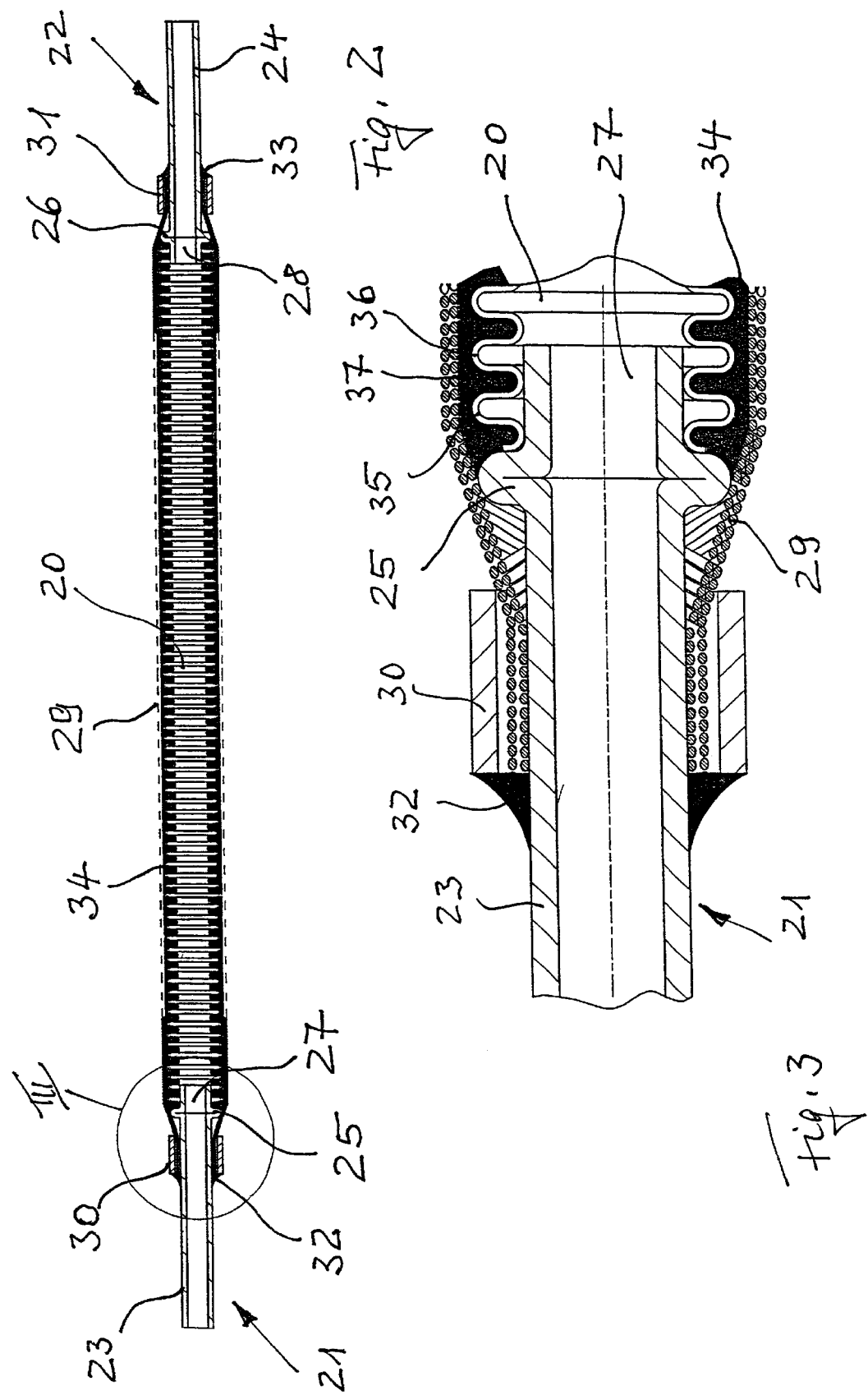

COOLANT LINE FOR AIR CONDITIONING SYSTEMS

CROSS-REFERENCE TO RELATED APPLICATION

This application claims the right of priority of German patent application No. 199 19 715.6, filed Apr. 30, 1999, and German patent application No. 100 14 560.4, filed Mar. 23, 2000, the disclosures of which are both incorporated herein by reference.

BACKGROUND OF THE INVENTION

The invention relates to a coolant line for air-conditioning systems operated with carbon dioxide as a coolant, particularly air-conditioning systems of motor vehicles, in which the line is connected tightly, particularly by being welded, at both ends to connecting parts for connection with further components.

Air-conditioning systems for motor vehicles have been operated with chlorofluorocarbon-containing coolants. Because of the relatively low pressure, namely in the range of 30 to 40 bar, these coolants have presented no problems in the use of flexible, elastomer coolant lines, which have the capacity for relative movement between the line parts to be connected, and are desirable or necessary for damping vibrations.

Because of environmental concerns and because carbon dioxide is easier to dispose of, there is a growing demand for carbon dioxide as a coolant. Since, however, carbon dioxide must be used in the liquid state, it is under considerable pressure, specifically up to 200 bar, so the known flexible elastomer hoses, which are pervious to carbon dioxide, can no longer be used. Instead, pressure-stable and impervious, rigid, smooth lines must be used, which do not sufficiently absorb relative movements. Furthermore, the connecting parts welded to the ends of these lines encounter stability problems due to vibrations.

SUMMARY OF THE INVENTION

It is therefore an object of the invention to provide a flexible coolant line that can absorb the relative movements of adjacent parts to the necessary extent, and can particularly damp the vibrations caused by the coolant compressor without the danger of friction-induced wear.

In accordance with the invention, this object and others to become apparent as the application progresses, are accomplished by the invention, which pertains to a coolant line for use with air conditioning systems operating with carbon dioxide as a coolant that comprises ends to connect the coolant line to the air conditioning system an inner, metallic, coolant-tight corrugated hose having crests and two hose ends each connected to a connecting part. A flexible metal jacket has two jacket ends each connected to respective connecting parts. The jacket surrounds the corrugated hose to provide an axial support resisting radial pressure in the coolant line. The jacket is spaced from the corrugated hose crests by a radial spacing. A substantially incompressible, temperature resistant intermediate plastic layer fills at least the radial spacing between the flexible metal jacket and the crests to prevent play between the corrugated hose and the jacket.

With these features, a corrugated hose comprising a known, flexible material performs the function of gas-tight guidance of the coolant. Because a hose alone may not withstand the high pressures and pressure pulsations coming from the coolant compressor, it is provided with a radially pressure-resistant, flexible metal jacket that supports the axial forces developed by the corrugated hose as it seeks to expand under internal-pressure stresses. To avoid a frictional contact between the corrugated hose and the metal jacket that could result in the destruction of the crests of the corrugated hose due to vibrations and pressure pulsations, a substantially compression-proof, plastic intermediate layer is provided between the corrugated hose and the metal jacket. This intermediate layer is capable of transmitting the necessary radial support forces between the corrugated hose and the metal jacket, and simultaneously performs the function of damping vibrations, such as pulsations originating from the coolant compressor.

The invention provides a line element that is suited for high pressures, possesses the necessary degree of flexibility and, at the same time, damps vibrational stresses and pressure-pulsation stresses.

The corrugated hose could be a metal hose provided with a threaded corrugated texture. Because of the torsional movements caused between the ends of the metal hose due to high internal pressures, it is preferred for the corrugated hose to comprise a stainless-steel, corrugated hose such as an annularly corrugated hose.

The metal jacket can be a braided-cable hose or a hose knitted from stainless-steel wires. A braided-cable hose is preferred for its ability to absorb higher support forces. The stretching stress exerted externally by the corrugated hose presses the braided-cable hose tightly against the plastic intermediate layer, so the hose is then sufficiently capable of supporting radial stresses originating from the high internal pressure stress of the corrugated hose.

It is considered especially advantageous for the metal jacket to be a stripwound metal hose with an interlocked profile, preferably disposed in a stretched position when in the mounted position of the line. This type of stripwound metal hose with interlocked profile is substantially rigid with respect to radial stress, so it can support radial expansions of the corrugated hose very well, even from high internal-pressure stress. It can also support the corrugated hose against a change in length caused by internal-pressure stress if it is installed such that it is in a stretched position when in the final position of the coolant line. This final mounted position can be a straight line or a curve.

A stripwound metal hose with interlocked profile is also capable of damping vibrations to a certain extent because of the mutual friction of the strip edges, which are folded together during the production of the hose. It can be advantageous for the packing density or strength of the interwoven strip segments of the stripwound metal hose with interlocked profile to be matched to the vibration damping required for the line through more or less tight weaving of the strips during production, so the hose offers more or less resistance to the mutual axial displacement of adjacent strip windings.

The intermediate layer between the corrugated hose and the jacket surrounding it with radial spacing can comprise a plastic that is foamed onto the outside of the corrugated hose, completely filling the outer contour of the corrugated hose and offering a smooth, cylindrical surface for pairing with the jacket. An intermediate layer of this type is partially compressible due to the gas bubbles it contains, but this compressibility is limited to that required to provide the necessary flexibility of the corrugated hose and adequate support of radial force. If especially high requirements are to be placed on the incompressibility of the intermediate layer, the material of the layer can be selected to have no gas bubbles.

A different design can involve forming the intermediate layer from a plastic hose that is slid onto the corrugated hose. This type of plastic hose is incompressible, and can therefore perform the support function for the corrugated hose without limitations. It is advantageous if the inside of the plastic hose is provided with a profiling that is adapted to the peaks of the radially-outside corrugation crests, and is slid onto the corrugated hose with a prestressing that is directed radially inward, so that it is thereby secured against displacement on the corrugated hose. This arrangement also facilitates the subsequent mounting of the outside metal jacket.

As mentioned above, the intermediate layer has free ends. It is preferred that the intermediate layer fill all of the radially-outward-projecting corrugation crests of the corrugated hose, so the intermediate layer can absorb all friction between the corrugated hose and the jacket caused by vibrations and pressure pulsations, in addition to the radial support of the corrugated hose. The plastic of the intermediate layer can be a temperature-stabilized elastomer, such as, preferably, silicone gum or silicone rubber.

It is preferable for the intermediate layer to be tightly connected to the connecting parts, because in this way the intermediate layer not only prevents the outside corrugation crests of the corrugated hose from fraying, but also offers effective protection against the entry of external impediments and, therefore, corrosion of the hose.

Preferably, the connecting parts for the coolant line are metal tubular pieces having a collar that is mounted in the region of the line-side end and projects radially outward. The collar can be formed from the metal tubular piece by radial expansion or folding. In such an embodiment, the jacket can then be connected, for example by welding, to the circumferential surface of the collar. Particularly for a jacket formed from a metal-wire braid, it is also possible for the jacket to extend beyond the respective collar and rest against the outer collar circumference, while its ends are secured, preferably by being welded, to the associated metal tubular piece on the other side of the collar with respect to the corrugated hose. This embodiment supports the transition of the jacket from the metal tubular piece, which has a smaller diameter, to the outside diameter formed by the corrugated tube with the mounted intermediate layer, during expansion or folding, to provide support at the diameter transition without additional stress at the end-side corrugations of the corrugated hose. The jacket ends can also be surrounded by an inserted metal support ring welded, with the jacket ends, to the metal tubular pieces.

The ends of the corrugated hose can be connected, preferably by being welded, to the radially-inside base of the respective associated collar, in which case it is advantageous that the metal tubular piece of the connecting parts projects into the end region of the corrugated hose adjacent to the collar, and has an outside diameter that corresponds to the inside hose diameter, so the corrugated hose has a radial support at the ends and in the radially-inward direction, and the welded connection between the corrugated hose and the connecting part is facilitated. An inexpensive connecting part for the collar can be formed from the metal tubular piece through its radial expansion so that the metal tubular piece and the collar thus form a one-piece component.

BRIEF DESCRIPTION OF THE DRAWINGS

FIG. 1 is an axial section view of a first embodiment of a coolant line.

FIG. 2 is an axial section view of a second embodiment of a coolant line.

FIG. 3 is an enlarged representation of the detail III from FIG. 2.

DETAILED DESCRIPTION OF THE PREFERRED EMBODIMENTS

FIG. 1 shows a stainless-steel annularly corrugated hose 1, which is connected at its ends to connecting parts 2, 3 by laser-welded seams 4, 5.

The connecting parts 2, 3 comprise tubular pieces 6, 7, respectively, each having an outer, free end that can be embodied as a welding end suitable for welding to further components. In the region of the ends of the corrugated hose 1, radially-outward-projecting collars 8, 9 are formed in the tubular pieces 6, 7, respectively, through deformation, so the tubular pieces each have an end that project with a section 10, 11, respectively, into one of the respective ends of the corrugated hose 1, thereby holding the corrugated hose 1 at its inside and simultaneously facilitating the production of the welded seams 4, 5.

A stainless-steel, stripwound metal hose with interlocked profile 12, whose ends are secured to the circumferential surface of the respective associated collar 8, 9, for example through spot welding, is provided with a radial spacing from the outer circumference of the corrugated hose 1. The stripwound metal hose with interlocked profile 12 is located in the expanded, that is, stretched, position if the mounted shape of the coolant line corresponds to illustrated shape. If the coolant line is to be installed in a curved shape, in the position visible in the drawing, the stripwound metal hose with interlocked profile 12 is in such a position that it enters the stretched position on the outside of the curve created when the coolant line is curved.

The stripwound metal hose with interlocked profile 12 is substantially rigid with respect to radial stress, so it can support radial expansions originating from the corrugated hose 1 under high internal-pressure stress. In this connection, to avoid an abrasive contact between the corrugated hose 1 and the stipwound metal hose with interlocked profile 12, the radial space between these two parts is occupied, so as to prevent play, by a silicone gum or silicone-rubber hose 13. The silicone-rubber hose 13 can be slid onto the corrugated hose 1 with a radial prestress, which is not illustrated, so it is secured against axial displacement on the corrugated hose due to the slight arching of the material of the silicone-rubber hose 13 into the space between adjacent corrugation crests 14, 15 of the corrugated hose 1. A slight penetration of the silicone-rubber hose 13 into the space between adjacent corrugation crests 14, 15 can be additionally effected or supported if the inside surface of the silicone-rubber hose 13 is already profiled correspondingly during production.

While the described coolant line is flexible, it is also suitable for receiving a coolant under high pressure. Its construction allows it to damp vibrations, particularly pressure pulsations coming from the coolant compressor.

Because the corrugated hose 1 is supported radially and axially, it can have relatively thin walls and therefore be highly flexible, despite the high internal-pressure stress to be absorbed. A preferred sufficient radial thickness of the silicone-rubber hose 13, that is, corresponding to the radial distance between the corrugated hose 1 and the stripwound metal hose with interlocked profile 12, is 1 to 1.5 mm.

FIG. 2 shows a modification of the coolant line of FIG. 1. FIG. 3 is an enlarged representation of one end of the line for a better overview.

Similar to the embodiment in FIG. 1, in FIGS. 2 and 3, a corrugated ring hose 20 comprising stainless steel is connected at its ends to respective connecting parts 21, 22, for example by laser-welded seams. The connecting parts 21, 22 comprise tubular pieces 23, 24, which fold to form radially-outward-projecting collars 25, 26 in the region of the ends of the corrugated hose 20, such that the tubular pieces project with an end segment 27, 28 into the ends of the corrugated hose 20 to support the inside of the hose.

A stainless-steel braided-cable hose 29 is spaced radially from the corrugated hose 20. Its ends are guided toward the tubular pieces 23, 24 by way of the collars 25, 26, and are welded there to inserted support rings 30, 31 at locations 32, 33. This construction relieves the end corrugations of the corrugated hose 20 from the transition from the braided-cable jacket 29 to the smaller outside diameter of the tubular pieces 23, 24 through the absorption of the associated stress by the collars or folds 25, 26.

With respect to radial stress, the braided-cable hose 29 is rigid enough to support radial expansions originating from the corrugated hose 1 under high internal-pressure stress. To prevent abrasive contact between the corrugated hose 20 and the braided-cable jacket 29, the radial space between these two parts is filled, so as to prevent play, with an intermediate layer 34 comprising a plastic that is foamed onto the outside of the corrugated hose 20 and fills in the corrugation troughs 37 of the corrugated hose 20 between adjacent corrugation crests 35, 36. For covering the corrugated hose 20 tightly with the intermediate layer 34, the ends of the layer 34 are simultaneously tightly connected to the connecting parts 21, 22 or their folds 25, 26 during the spraying process. This not only prevents friction between the corrugated hose 20 and the braided-cable jacket 29, but also protects the corrugated hose 20 from external damage by corrosive agents.

Of course, different combinations of the embodiments illustrated in FIGS. 1, 2 and 3 are also conceivable. For example, the intermediate layer 34 according to FIGS. 2 and 3 can also be replaced by a silicone-rubber hose 13 such as illustrated in FIG. 1, in which case the silicone-rubber hose 13 is also guided outward at the ends by way of the folds 25, 26, so it also tightly surrounds the corrugated hose 20. The intermediate layer 34 comprising foamed plastic could also be used in the embodiment of FIG. 1, and be connected tightly to the collars 8, 9 in the spraying process.

It will be understood that the above description of the present invention is susceptible to various modifications, changes and adaptations, and the same are intended to be comprehended within the meaning and range of equivalents of the appended claims.

What is claimed is:

1. A coolant line for use with an air conditioning system operating with carbon dioxide as a coolant, comprising:
   an inner, metallic, coolant-tight corrugated hose having crests defining a radial outside diameter; the hose having a hose end;
   a flexible metal jacket having a jacket end; the jacket surrounding said hose to provide an axial support resisting radial pressure in the coolant line; said jacket being spaced from said crests of said hose by a radial clearance;
   a connecting part connected to said hose end for coupling said hose end to the air conditioning system; said connecting part being formed of a metal tubular piece having a radially outward projecting collar; said metal tubular piece projecting into said jacket at said jacket end; said jacket surrounding and contacting said collar along an outer circumference of said collar; said jacket extending beyond said collar and being affixed to said metal tubular piece on a side of said collar oriented away from said hose end; and
   a substantially incompressible, temperature resistant intermediate plastic layer filling at least said radial clearance between said jacket and said crests to prevent play between said hose and said jacket.

2. The coolant line according to claim 1, wherein said corrugated hose is a stainless-steel, annularly corrugated hose.

3. The coolant line according to claim 1, wherein said jacket is a braided-cable hose.

4. The coolant line according to claim 1, wherein said jacket is knitted from stainless-steel wires.

5. The coolant line according to claim 1, wherein said intermediate layer comprises a plastic that is foamed onto the outside of said corrugated hose and said corrugated hose has corrugation troughs that are filled by the intermediate layer.

6. The coolant line according to claim 5, wherein said plastic hose comprises a temperature-stabilized elastomer.

7. The coolant line according to claim 1, wherein said intermediate layer is formed by a plastic hose that is slid onto said corrugated hose.

8. The coolant line according to claim 7, wherein said corrugated hose has radially-outside corrugation crests having peaks, and said plastic hose is provided with a profiling that matches said peaks.

9. The coolant line according to claim 7, wherein said plastic hose is slidable onto said corrugated hose and said plastic hose has a prestress directed radially inward when said plastic hose is on said corrugated hose.

10. The coolant line according to claim 1, wherein said intermediate layer is tightly connected to the connecting part.

11. The coolant line according to claim 1, wherein said collar is formed from said metal tubular piece by one of radial expansion or folding.

12. The coolant line according to claim 1, wherein said jacket is welded to said collar.

13. The coolant line according to claim 1, wherein said jacket end is welded to said tubular piece.

14. The coolant line according to claim 1, further comprising a metallic support ring, said support ring and said jacket end being welded to said metal tubular piece.

15. The coolant line according to claim 1, wherein said collar has a radially-inside base and said corrugated hose is connected to said collar at said radially-inside base.

16. The coolant line according to claim 15, wherein said metal tubular piece projects into the end of the corrugated hose adjacent to the collar, and said metal tubular piece has an outside diameter that corresponds to an inside diameter of said hose.

17. The coolant line according to claim 1, wherein said metal tubular piece comprises stainless steel.

18. The coolant line according to claim 1, wherein said hose is welded to said metal tubular piece.

19. The coolant line according to claim 1, wherein said intermediate layer is formed by a silicone rubber hose inserted onto said corrugated hose.

20. A coolant line for use with an air conditioning system operating with carbon dioxide as a coolant, comprising:
   an inner, metallic, coolant-tight corrugated hose having crests defining a radial outside diameter and having two hose ends;
   a pair of connecting parts each connected to a respective hose end for connecting the respective hose ends to the air conditioning system;

a flexible metal jacket composed of a stripwound metal hose; the jacket having two jacket ends each connected to respective ones of said connecting parts, said jacket surrounding said corrugated hose to provide an axial support resisting radial pressure in the coolant line, and said jacket being spaced from said crests of said corrugated hose by a radial spacing; and a substantially incompressible, temperature resistant intermediate plastic layer that fills at least the radial spacing between said flexible metal jacket and said crests to prevent play between said corrugated hose and said jacket.

21. The coolant line according to claim 20, wherein said stripwound metal hose with interlocked profile is installed in a stretched position with respect to the mounted shape of the line.

22. The coolant line according to claim 20, wherein said stripwound metal hose with interlocked profile comprises interwoven strip segments and at least one of a packing density and a strength of said strip segments provides vibration damping.

23. The coolant line according to claim 20, wherein said stripwound metal hose with interlocked profile comprises stainless steel.

* * * * *